Feb. 26, 1935.  J. W. KUNNEKE  1,992,827
SIGNAL DEVICE
Filed July 22, 1930  2 Sheets-Sheet 1

Inventor
John W. Kunneke
By Mason Fenwick & Lawrence
Attorneys

Feb. 26, 1935. J. W. KUNNEKE 1,992,827
SIGNAL DEVICE
Filed July 22, 1930 2 Sheets-Sheet 2
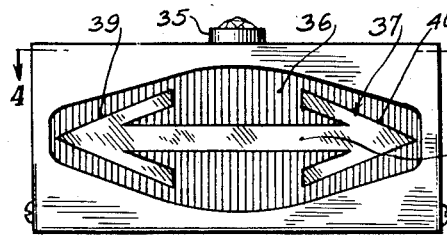
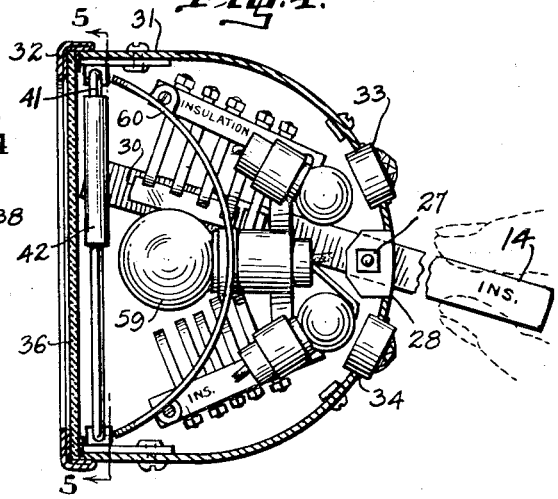
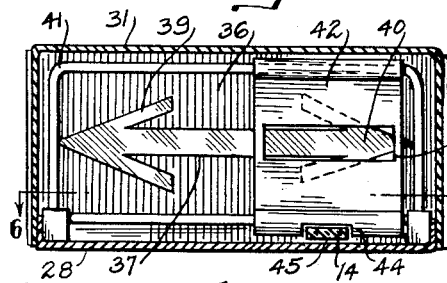
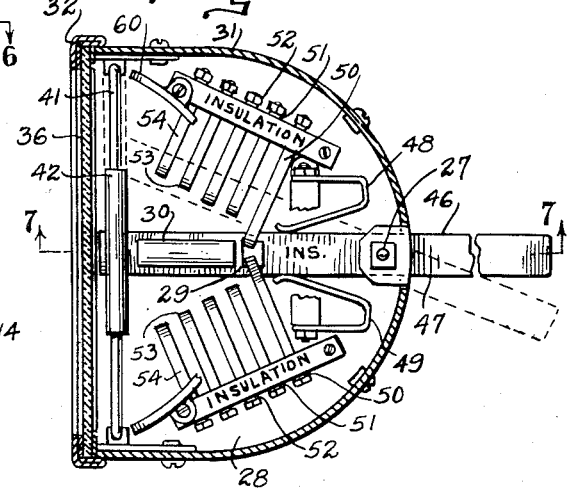
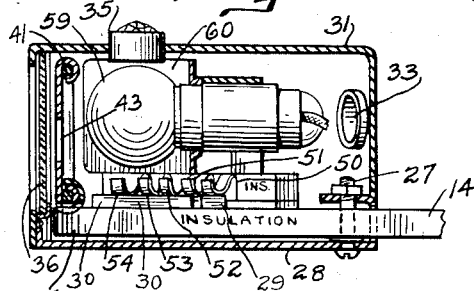
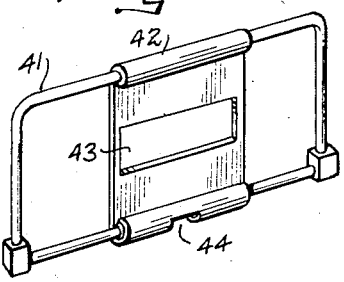
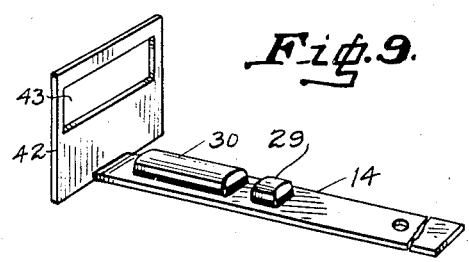
Inventor
John W. Kunneke
By Mason Fenwick Lawrence
Attorneys Patented Feb. 26, 1935

1,992,827

UNITED STATES PATENT OFFICE 1,992,827

SIGNAL DEVICE

John Wendell Kunneke, Louisville, Ky.

Application July 22, 1930, Serial No. 469,845

2 Claims. (Cl. 116—44)

This invention relates to signal systems for use on automobiles or other vehicles for indicating traffic movements; and more particularly, a right or left turn.

The prime object of the invention is to provide indicating means for informing approaching traffic as well as traffic in the rear, that a turn in either a right or left direction is contemplated. I realize that broadly speaking, this same problem has been solved; but by employing different means in a more complicated manner, with less efficient results.

Still another object is to provide a signal box which utilizes a single source of light for indicating opposite directions.

Other objects of the invention will be disclosed in the specification and claims forming a part of this application.

In the drawings:

Figure 3 is a front elevation of the signal box;

Figure 4 is a section taken on line 4—4 of Figure 3;

Figure 5 is a section taken on line 5—5 of Figure 4;

Figure 6 is a section taken on line 6—6 of Figure 5;

Figure 7 is a section taken on line 7—7 of Figure 6;

Figure 8 is a perspective of the screen removed from the front signal box; and

Figure 9 is a modified form of screen which may be used in the front signal box.

Referring to the drawings in which like parts are designated by similar numerals:

Figure 1:
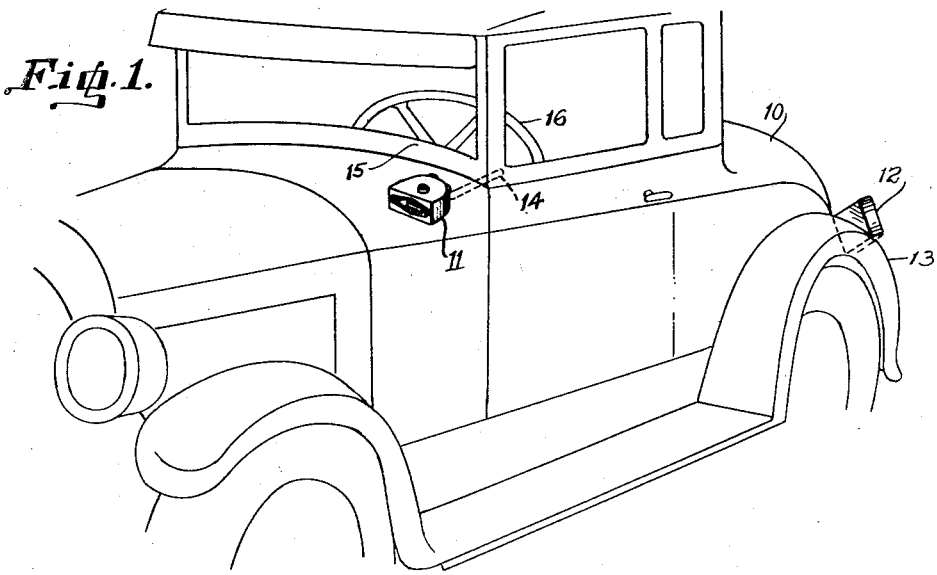
Figure 1 is a perspective of an automobile showing the position of the signal indicators in relation to the vehicle.

Numeral 10 designates a vehicle on which is mounted a front signal box 11, and a rear signal box 12. The rear signal box 12 is mounted at any suitable place in the rear, preferably on the rear fender 13. The front signal box 11 is positioned preferably on the left side of the vehicle 10 so that it can readily be manipulated by the driver and can more readily be seen by approaching traffic which will be on the driver's left hand side under normal driving conditions in this country. It is, of course, obvious that this arrangement may be reversed should the car be a right hand drive, or traffic laws be changed so that vehicles will keep to the left hand side of the road instead of the right, which is the customary drive in some foreign countries.

A handle 14 extends from the front signal box 11 beneath the windshield 15 so that the driver may readily operate the same without taking his attention from the steering wheel 16. Again, it is obvious that various forms of handles 14 may be utilized, where obstructions such as the gas tank would interfere with the handle extending directly through the body of the car; but for the purpose of illustrating this invention, the handle is shown extending directly through the body and in easy reach of the driver.

The rear signal box 12 does not form a part of this invention per se, as it is of more or less standard construction being divided into three compartments, the upper of which 17, contains the usual "stop" signal 18; the center or middle compartment 19 having lights 20 and 21 with a double headed arrow 22 formed in the cover 23 with a partition 24 dividing the compartment 19 so that either light 20 or 21 will be eliminated according to the direction of the turn; and the bottom compartment 25 contains the usual tail light 26.

Referring to the front signal box 11 which is more particularly shown in Figures 3, 4, 5, 6, and 7, the handle 14 is pivotally connected at 27 to a base plate 28. This handle 14 is preferably made of insulating material, and has mounted thereon a contact point 29, particularly shown in Figure 6, and a contact plate 30, separated from each other. A removable housing 31 is secured to the base plate 28, the housing 31 being preferably formed of circular contour along the sides and rear with a flat front part 32. Telltale openings 33 and 34 are formed in the rear with a tell-tale opening 35 formed in the top. Colored glass is usually placed in the tell-tale openings.

In the front face part 32 is mounted a glass 36. The glass 36 has an indicator 37 formed therein, consisting of a shaft 38 extending horizontally through said glass 36, with arrow heads 39 and 40 mounted at both ends of the shaft 38. The indicator 37 is of translucent colored glass, the rest of the glass 36 being of opaque material so that the source of illumination will only be visible through the indicator 37.

Figure 2:
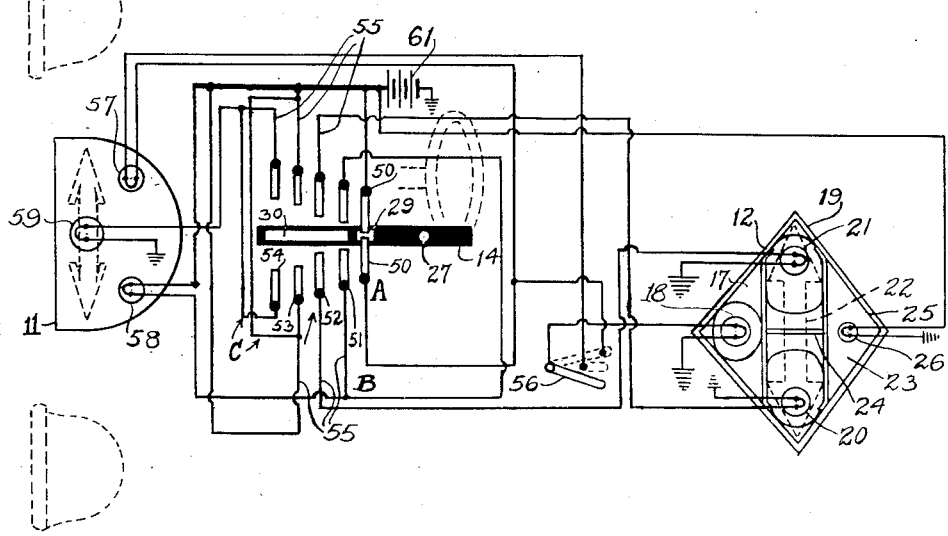
Figure 2 is a diagrammatic view of the wiring system in relation to the signals.

Mounted in the front end of the housing 31 and secured to the base plate 28, is a frame 41. Slidably mounted on the frame 41 is a screen 42 having an opening 43 formed therein, the opening 43 being of the same diameter as the shaft 38, the screen 42 being of substantially the same width as the arrow heads 39 and 40. A depression 44 is formed in the base of the screen 42 to receive the end 45 of the handle 14. On opposite sides 46 and 47 of the handle 14 are placed flat springs 48 and 49. On both sides of the handle 14 and angularly disposed thereto, are placed a plurality of contact fingers 50, 51, 52, 53 and 54. Not only are the contact fingers angularly disposed to the handle 14, but the fingers decrease in length, fingers 54 being shorter than the longest fingers 50. Wires 55 lead from the contact fingers 50, 51, 52, 53, and 54 to form the various circuits hereinafter to be described, and more particularly shown in Figure 2.

As actually operated, the handle 14 will be rotated in either a right or left hand direction, according to the signal desired to be communicated to approaching traffic. As shown in Figure 6, the handle 14 is in at rest position and only fingers 50 are in contact with the contact point 29. When in this position, the circuit A, shown in Figure 2, leading to the stop signal 18, is complete and in condition to be operated in the usual manner by the foot brake 56.

At the same time, a tell-tale light 57 mounted in the front signal box 11, will light up upon the foot brake 56 being operated to show that the same is in operative condition. As a downward movement of the foot brake 56 is continued, the tell-tale light 57 will go off due to the foot brake breaking contact with the tell-tale light circuit. Upon the handle 14 being moved in a right hand direction, the contact point 29 will be moved away from the right hand contact finger 50, thus breaking the A circuit. The handle 14 will continue to be moved until the contact plate 30 contacts with fingers 51 and 52 on the left hand side.

Circuit B will then be brought into operation. Circuit B connects up the light 21 on the right hand side in the rear signal box 12, and also a second tell-tale light 58 mounted in the housing 31 of the front signal box 11. As the handle 14 continues to move to the right, fingers 53 and 54 are connected up by the contact plate 30, which brings the circuit C into operation, the same as circuit B except that a direction light 59 in the front signal box 11 is illuminated, and at the same time, the tell-tale light 58 is left out of the circuit since the tell-tale openings 33 and 34 at the rear of the housing 31 will afford the driver an opportunity to ascertain whether the circuit is in operation. A reflector 60 is placed behind the direction light 59 and is supported by the base plate 28.

At the same time that the handle 14 has been making contact with the fingers 51, 52, 53, and 54 on the left hand side, the screen 42 has been moved to the left so that by the time that fingers 53 and 54 have made contact with plate 30, the screen 42 will have blotted out the arrow head 40, leaving the opening 43 to coincide with the shaft 38 and give the appearance of a continuous arrow in one direction. Thus, a single direction light 59 is utilized to indicate opposite directions, since a maneuvering of the handle 14 in an opposite direction will repeat the operation already described to indicate a turn in the opposite direction, and the screen 42 will likewise be moved in an opposite direction and serve to blot out the arrow head 39 giving the appearance of a single arrow which will indicate the direction of turn.

A source of power, such as a battery 61 is connected to the circuits A, B and C, as well as with the "stop" light 18. When the rear direction signal light and front direction signal light are in circuit, as shown by circuit C, there is of course no need for the tell-tale light 58. Since electricity travels through the shortest path, subject to the least resistance, the current will pass through the circuit C, since the path is shorter than that of circuit B and the tell-tale light 58 would be added resistance to the circuit.

Figure 9 shows a modified form of my invention in which the screen 42 is directly mounted on the switch handle 14 and the frame 41 is omitted.

It is obvious that under normal conditions the stop light 18 is in contact with the handle 14, but controlled by the foot brake 56. When a turn is contemplated it is no longer necessary to utilize the stop signal so that upon the turn signal being given, the stop signal 18 will not be available, being out of contact with the handle 14.

It is obvious that the front signal box may be used in divers positions and independent of the arrangement and manner shown without departing from the scope of my invention.

What I claim is:

1. A signal comprising a casing having a direction indicating transparency in a wall thereof, said transparency having the configuration of a shaft, and reversely directed pointing indicia at opposite ends of said shaft, having portions extending beyond the width boundaries of said shaft, a screen within said casing slidable longitudinally of said transparency having a cut-out coinciding in width with the width of said shaft, and having opaque portions at the sides of said cut-out for obliterating the distinctive portions of said pointing indicia, and a handle for shifting said screen pivoted within said casing, engaging said screen at one end and extending outside of said casing at the other end.

2. A signal as claimed in claim 1, including a frame on which said screen is slidable.

JOHN WENDELL KUNNEKE.